(12) United States Patent
Van Der Tempel et al.

(10) Patent No.: US 12,195,148 B2
(45) Date of Patent: Jan. 14, 2025

(54) SYSTEM FOR TRANSPORTING AN OFFSHORE STRUCTURE

(71) Applicant: Delft Offshore Turbine B.V., Delft (NL)

(72) Inventors: Jan Van Der Tempel, Delft (NL); Andrey Vladimirovich Metrikine, Delft (NL)

(73) Assignee: DELFT OFFSHORE TURBINE B.V., Delft (NL)

( * ) Notice: Subject to any disclaimer, the term of this patent is extended or adjusted under 35 U.S.C. 154(b) by 500 days.

(21) Appl. No.: 17/637,287

(22) PCT Filed: Aug. 21, 2020

(86) PCT No.: PCT/NL2020/050523
§ 371 (c)(1),
(2) Date: Feb. 22, 2022

(87) PCT Pub. No.: WO2021/040516
PCT Pub. Date: Mar. 4, 2021

(65) Prior Publication Data
US 2022/0281571 A1    Sep. 8, 2022

(30) Foreign Application Priority Data

Aug. 23, 2019  (NL) ...................................... 2023699

(51) Int. Cl.
*B63B 77/10*  (2020.01)
*B63B 35/44*  (2006.01)
(Continued)

(52) U.S. Cl.
CPC .............. *B63B 77/10* (2020.01); *B63B 35/44* (2013.01); *F03D 13/25* (2016.05); *F03D 13/40* (2016.05);
(Continued)

(58) Field of Classification Search
None
See application file for complete search history.

(56) References Cited

U.S. PATENT DOCUMENTS 4,761,097 A *  8/1988  Turner ................... E02B 17/024
                                                              405/209
2009/0191002 A1* 7/2009 Stubler ................. E02B 17/027
                                                              405/209
(Continued)

FOREIGN PATENT DOCUMENTS

DE         102013113022 A1    5/2014
EP           2251254 A1      11/2010
(Continued)

OTHER PUBLICATIONS

International Search Report dated Jun. 21, 2024, issued in corresponding Taiwanese Patent Application No. 109128844 (1 pg.).
(Continued)

*Primary Examiner* — S. Joseph Morano
*Assistant Examiner* — Jovon E Hayes
(74) *Attorney, Agent, or Firm* — Pillsbury Winthrop Shaw Pittman, LLP

(57) ABSTRACT

System for transporting an offshore structure, the system comprising: a transport apparatus, in particular a vessel or a vehicle, which is configured to receive an offshore structure and to form a slip joint with a slip joint section of a received offshore structure, wherein the system is configured to enter a releasable state, from a fixing state, wherein, in the releasable state, the slip joint formed by the transport apparatus and the offshore structure is smaller than that force in the fixing state.

22 Claims, 5 Drawing Sheets

(51) Int. Cl.
  *F03D 13/25* (2016.01)
  *F03D 13/40* (2016.01)
  *E02B 17/00* (2006.01)
(52) U.S. Cl.
  CPC . *B63B 2035/446* (2013.01); *E02B 2017/0043* (2013.01); *E02B 2017/0047* (2013.01); *E02B 2017/0052* (2013.01); *E02B 2017/0091* (2013.01); *F05B 2240/95* (2013.01); *F05B 2260/02* (2013.01)

(56) References Cited

U.S. PATENT DOCUMENTS

| | | | |
|---|---|---|---|
| 2011/0139056 A1* | 6/2011 | Cholley | F03D 13/10 405/209 |
| 2019/0071830 A1* | 3/2019 | Lindblade | E02B 17/024 |
| 2021/0246878 A1* | 8/2021 | Van Hintum | F03D 13/25 |
| 2022/0388815 A1* | 12/2022 | Soerensen | F03D 13/25 |

FOREIGN PATENT DOCUMENTS

| | | | |
|---|---|---|---|
| EP | 2905217 A1 | 8/2015 | |
| GB | 2004581 A | 4/1979 | |
| GB | 2454585 A | 5/2009 | |
| JP | S57-130889 A | 8/1982 | |
| JP | S61-143292 A | 6/1986 | |
| JP | H11-502276 A | 2/1999 | |
| JP | 2011-112044 A | 6/2011 | |
| JP | 2012-107586 A | 6/2012 | |
| JP | 2013-029101 A | 2/2013 | |
| JP | 2015-511283 A | 4/2015 | |
| KR | 101724593 B1 | 4/2017 | |
| RU | 146162 U1 | 10/2014 | |
| RU | 146163 U1 | 10/2014 | |
| RU | 146473 U1 | 10/2014 | |
| WO | 2011/031148 A1 | 3/2011 | |
| WO | 2014/204372 A1 | 12/2014 | |
| WO | 2016/063210 A1 | 4/2016 | |
| WO | 2018/070868 A1 | 4/2018 | |
| WO | WO-2022084344 A1 * | 4/2022 | B63B 27/10 |

OTHER PUBLICATIONS

International Preliminary Report on Patentability dated Dec. 3, 2021, issued in corresponding International Application No. PCT/NL2020/050523 (22 pgs.).

International Search Report dated Nov. 6, 2020, issued in corresponding International Application No. PCT/NL2020/050523 (3 pgs.).

* cited by examiner

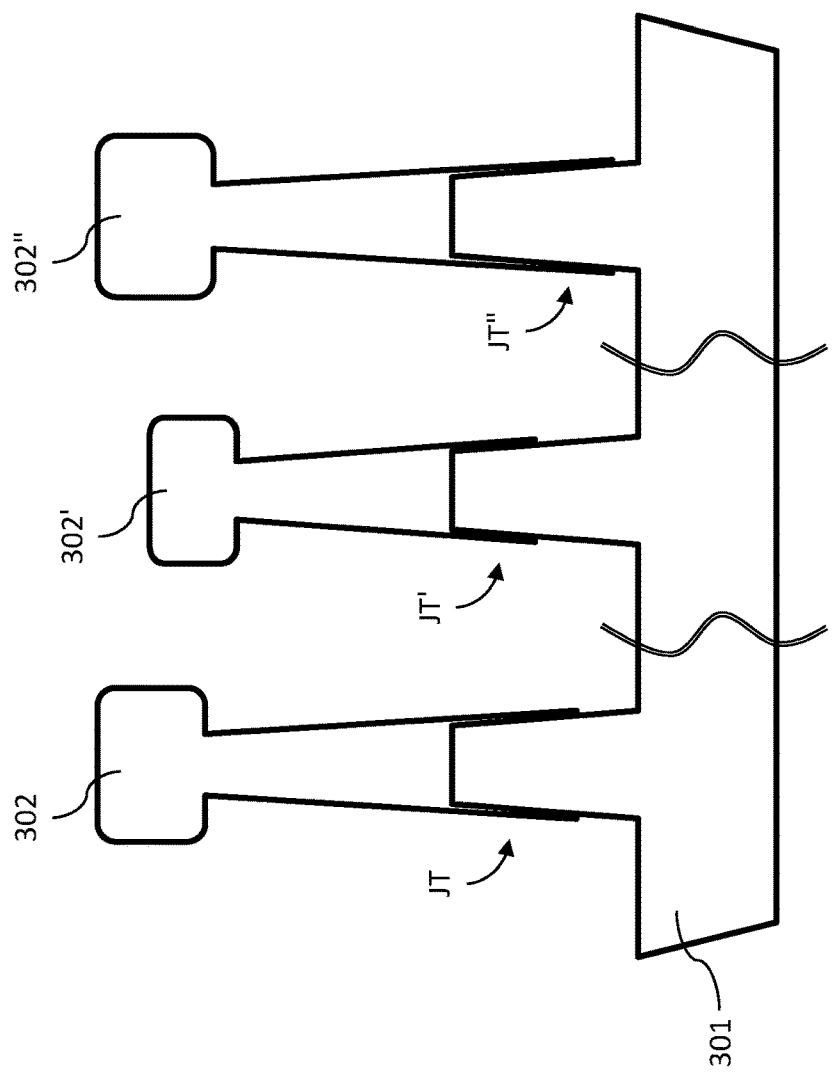
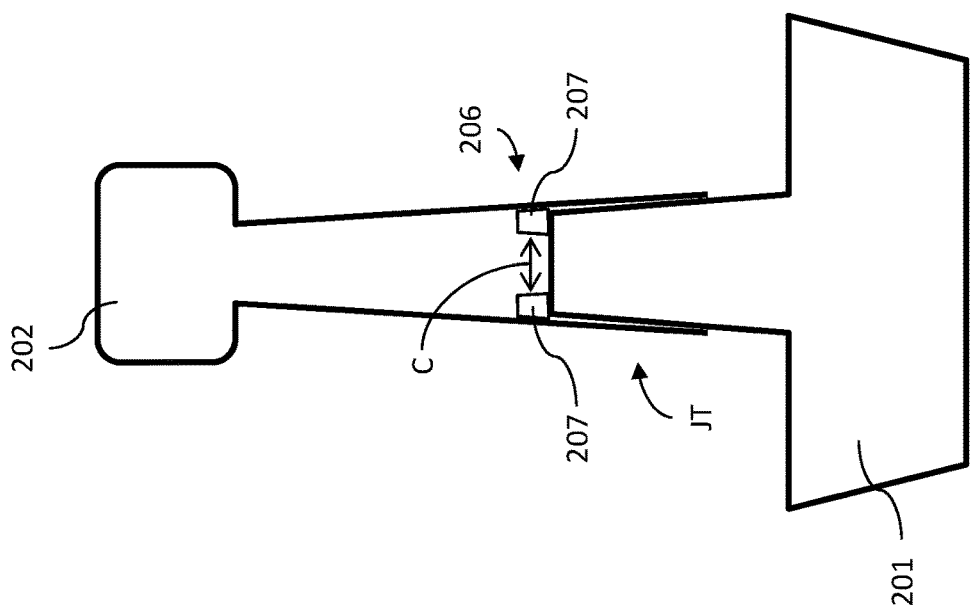

SYSTEM FOR TRANSPORTING AN OFFSHORE STRUCTURE

CROSS-REFERENCE TO RELATED APPLICATIONS

This application is the U.S. National Phase of International Application No. PCT/NL2020/050523, filed Aug. 21, 2020, which in turn claims priority to NL 2023699, filed Aug. 23, 2019, the contents of each of which are hereby incorporated by reference in their entireties.

The invention concerns a system for transporting an offshore structure.

Offshore structures may need to be transported, e.g. from an onshore location to an offshore location or vice versa. This can pose challenges as the structures can be substantially large and heavy, for example relative to a transport apparatus, e.g. a ship, on which the structure is transported. To enable stable transportation it is generally necessary to substantially fix or fasten the offshore structure to such a transport apparatus. This is especially critical when the offshore structure's center of gravity is substantially far away from where it is supported by the transport apparatus, e.g. in the case of offshore wind turbines which are transported on a ship in an upright orientation. Upon arrival, e.g. at the offshore location, the offshore structure needs to be released from the transport apparatus, which generally requires that the fastening be undone or reversed.

In known solutions for fastening an offshore structure to a transport apparatus, many nuts and bolts are used to tightly connect the offshore structure to the transport apparatus, which nuts and bolts later need to be undone to release the offshore structure. This is very labor intensive and time consuming, during receiving and fastening as well as during releasing. Moreover, with this solution, the transport apparatus needs to be specifically configured to accommodate the particular size and configuration (e.g. including positions of holes for bolts) of the offshore structure.

It is an object of the present invention to provide an improved system for transporting an offshore structure, in particular to overcome at least one of the above mentioned problems. Further objects of the invention are to provide: an improved method for transporting an offshore structure; an improved transport apparatus; and an improved offshore structure.

An aspect of the invention provides a system for transporting an offshore structure, the system being characterized by the features of claim 1.

The system comprises a transport apparatus, in particular a vessel or a vehicle, which is configured to receive an offshore structure and to form a slip joint with a slip joint section of a received offshore structure.

The system is configured to enter a releasable state, from a fixing state, wherein, in the releasable state, the slip joint force of the slip joint formed by the transport apparatus and the offshore structure is smaller than that force in the fixing state.

The slip joint can provide safe and efficient means for substantially quickly fastening the offshore structure to the transport apparatus. For example, the slip joint can be formed and/or maintained under influence of the self weight of the offshore structure. Moreover, in this way, offshore structures of various dimensions can be interchangeably accommodated on the transport apparatus substantially without requiring specific modification of the transport apparatus. By being configured to enter the releasable state, the system can provide safe and efficient means for substantially quickly releasing the offshore structure from the transport apparatus.

In an embodiment, in the fixing state, the offshore structure is fixed to the transport apparatus, wherein, in the releasable state, the offshore structure is releasable from the transport apparatus, e.g. using a lifting means.

Thus, by the system entering the releasable state, from the fixing state, the offshore structure can be brought from a state wherein the structure is fixed to the transport apparatus (e.g. for stable and secure transportation) to a state wherein the structure can be released (e.g. for delivering the offshore structure at a delivery location).

In an embodiment, the system further comprises a vibration generator for vibrating the transport apparatus and the offshore structure with respect to each other, in particular for reducing the slip joint force.

It has been found that such a vibration generator can provide effective means for reducing the slip joint force.

In an embodiment, the vibration is generated substantially at one or more predetermined resonance frequencies.

It has been found that vibrations at such frequencies can be especially effective in reducing the slip joint force.

In an embodiment, the system further comprises a separation system, for example including one or more mechanical force generators (e.g. jacks), configured to exert a separating force between the offshore structure and the transport apparatus.

Such a separation system can advantageously provide means to aid in the reduction of the slip joint force, for example complementary to the vibration generator, as well as to substantially separate the offshore structure from the transport apparatus while the slip joint force is reduced. Separating the offshore structure from the transport apparatus in this way can help to prevent that the slip joint force can increase again after having been reduced, for example under influence of the offshore structure's self weight and/or in response to handling of the offshore structure, e.g. by lifting means.

In an embodiment, the system, preferably the transport apparatus, comprises a clamping device in addition to the slip joint, for clamping the offshore structure and the transport apparatus to each other, wherein, in the fixing state, the offshore structure and the transport apparatus are substantially clamped to each other by the clamping device, wherein the clamping device is preferably configured to press, e.g. hydraulically, one or more, for example two, clamping elements, preferably in respective one or more clamping directions which extend towards the transport apparatus and/or the offshore structure.

The clamping device can provide complementary means for efficiently and quickly fastening and releasing the offshore structure.

In an embodiment, the transport apparatus and the offshore structure each include a respective sloping surface section, for example a conical surface or a frusto-conical surface, preferably mating surfaces, wherein the respective sloping surface sections are configured to form the slip joint with each other, in particular when they are positioned onto each other.

Such respective surfaces can provide effective means for forming the slip joint. Moreover, they can provide means for offshore structures of various dimensions to be interchangeably accommodated on the transport apparatus substantially without requiring specific modification of the transport apparatus. For example, various sizes of frusto-conical surfaces of offshore structure sections can be accommodated by lowering them down to respective various levels of a frustoconical surface section of the transport apparatus.

In an embodiment, the transport apparatus is configured to receive the offshore structure in a receiving direction, in particular to form the slip joint with the slip joint section of the offshore structure, wherein the receiving direction substantially coincides with a direction of a force of gravity acting on the offshore structure, the receiving direction being in particular a substantially downward direction.

Advantageously, the slip joint can thus be formed and/or maintained under influence of the self weight of the offshore structure.

In an embodiment, the system further comprises a lifting device, e.g. a crane or the like, which is configured to lift the offshore structure and preferably to position the offshore structure, in particular with respect to the transport apparatus and/or with respect to another structure, e.g. a loading location base structure and/or a delivery location base structure.

Such a lifting device can provide means for releasing the offshore structure from the transport apparatus, in particular when the system is in the releasable state. The same or similar lifting device can be used for formation of the slip joint, e.g. by lowering the offshore structure onto the transport apparatus.

In an embodiment, the system is configured for transporting the offshore structure from a loading location, wherein the system further comprises a loading location base structure, for example a foundation, at the loading location, the loading location base structure e.g. being configured to form a slip joint with the offshore structure, wherein the system is configured to enter a loading base releasable state, from a loading base fixing state, wherein, in the loading base releasable state, the slip joint force of a slip joint formed by the loading location base structure and the offshore structure is smaller than that force in the loading base fixing state.

In this way, the offshore structure can be loaded safely, efficiently and quickly at the loading location. For example, the slip joint with the loading location base structure can thus be formed and released similarly compared to the slip joint with the transport apparatus.

In an embodiment, the system comprises a vibration generator for vibrating the loading location base structure and the offshore structure with respect to each other, in particular for reducing the slip joint force of the slip joint formed by said structures, wherein the vibration is preferably generated substantially at one or more predetermined resonance frequencies.

Such a vibration generator can provide analogous advantages, mutatis mutandis, compared to the earlier described vibration generator for vibrating the transport apparatus and the offshore structure with respect to each other.

In an embodiment, the system further comprises a loading base separation system, for example including one or more mechanical force generators, configured to exert a separating force between the offshore structure and the loading location base structure.

Such a loading base separation system can provide analogous advantages, mutatis mutandis, compared to the earlier described separation system for exerting a separating force between the offshore structure and the transport apparatus. The separating force may be significantly smaller than a weight of the offshore structure, wherein the separating force can provide for at least partly reaching said releasable state of the offshore structure. Alternatively, the separating force may be equal to or greater than the weight of the offshore structure.

In an embodiment, the system is configured for transporting the offshore structure to a delivery location, wherein the system further comprises a delivery location base structure, for example a foundation, at the delivery location, the delivery location base structure being configured to receive the offshore structure and to form a slip joint with the slip joint section of the offshore structure.

In this way, the offshore structure can be delivered safely, efficiently and quickly at the delivery location. For example, the slip joint with the delivery location base structure can thus be formed similarly compared to the slip joint with the transport apparatus.

In an embodiment, the transport apparatus is configured to receive a plurality of offshore structures and to form a respective slip joint with the slip joint section of each received offshore structure, wherein the system is configured, for each received offshore structure, to enter a respective releasable state, from a respective fixing state, wherein, in the releasable state, the slip joint force of a slip joint formed by the transport apparatus and the offshore structure is smaller than that force in the fixing state.

Such a system can advantageously provide that multiple offshore structures can be transported simultaneously with benefit of the above mentioned advantages.

In an embodiment, the offshore structure includes one or more wind turbines and/or one or more wind turbine, for example a pile and/or a nacelle, and/or one or more multi member offshore structures such as jackets, tripods and/or topsides.

Also, for example, in an embodiment, a single offshore structure can be configured to be supported by a plurality (e.g. two, three, four or more) slip joints. In that case, preferably, the system is configured to enter a releasable state, from a fixing state, wherein, in the releasable state, each slip joint force of each of the plurality of slip joints formed by the transport apparatus and the offshore structure is smaller than the respective force in the fixing state.

In an embodiment, the offshore structure has a mass which is larger than fifty thousand kg or larger than 490.000 N.

Such a large mass can advantageously aid in forming a slip joint under influence of the self weight of the offshore structure.

A further aspect of the invention provides a method for transporting an offshore structure. The method comprises receiving an offshore structure on a transport apparatus and forming a slip joint between the transport apparatus and the received offshore structure. The method further comprises: reducing a slip joint force of the slip joint; and releasing the offshore structure from the transport apparatus after reducing the slip joint force.

The slip joint should preferably be understood as being formed and/or maintained at least under influence of the weight of the offshore structure.

Such a method can provide the above mentioned advantages.

In an embodiment, the method further comprises generating a vibration of the offshore structure and/or the transport apparatus, preferably substantially at one or more predetermined resonance frequencies, thereby reducing the slip joint force of the slip joint.

In an embodiment, the method further comprises exerting a separating force between the offshore structure and the transport apparatus.

In an embodiment, the separating force is exerted before the vibration is generated.

It has been found that this can enhance the effectiveness of the vibrations in reducing the slip joint force.

In an embodiment, the separating force is exerted while the vibration is generated.

In this way the offshore structure can be separated from the transport apparatus, in particular stably and in a well-controlled manner.

In an embodiment, the method further comprises: measuring a displacement of the offshore structure with respect to the transport apparatus and/or measuring a pressure between the offshore structure and the transport apparatus; and releasing the offshore structure from the transport apparatus depending on the measured displacement and/or pressure.

In this way the offshore structure can be released from the transport apparatus is a smooth, safe and efficient manner. For example, the offshore structure may be released after the displacement is measured to be larger than a predetermined threshold displacement and/or a pressure is measured to be smaller than a predetermined threshold pressure.

In an embodiment, the method further comprises using active heave compensation, in particular during the releasing.

It has been found that transporting, in particular releasing, the offshore structure can be more stable and/or well-controlled with the use of active heave compensation.

A further aspect of the invention provides a transport apparatus, in particular of a system according to the invention, in particular a vessel or a vehicle, wherein the transport apparatus is configured to receive an offshore structure and to form a slip joint with a slip joint section of a received offshore structure.

Such a transport apparatus can provide the above mentioned advantages, in particular in combination with an offshore structure.

In an embodiment, the transport apparatus is provided with a vibration generator for vibrating the transport apparatus and an offshore structure received on the transport apparatus with respect to each other, in particular for reducing the slip joint force of the slip joint.

In an embodiment, the transport apparatus is provided with a separation system, for example including one or more mechanical force generators, configured to exert a separating force between the offshore structure and the transport apparatus.

A further aspect of the invention provides an offshore structure, in particular of a system according to the invention, in particular including a wind turbine and/or one or more wind turbine components and/or one or more multi member offshore structures, wherein the offshore structure has at least one slip joint section configured to form a slip joint with a respective slip joint section of a transport apparatus, e.g. a transport apparatus according to the invention, in particular for fixing the offshore structure to the transport apparatus.

Such an offshore structure can provide the above mentioned advantages, in particular in combination with the transport apparatus.

In an embodiment, the offshore structure is provided with a vibration generator for vibrating a transport apparatus on which the offshore structure is received and the offshore structure with respect to each other, in particular for reducing the slip joint force of the slip joint.

In an embodiment, the offshore structure is provided with a separation system, for example including one or more mechanical force generators, configured to exert a separating force between a transport apparatus and the offshore structure.

In the following, the invention will be further explained using exemplary embodiments and drawings. In the drawings:

FIG. 3a shows a cross section view of a system according to yet a further embodiment, wherein the system comprises a clamping device in addition to the slip joint;

FIG. 3b shows a cross section view of a system according to yet a further embodiment, wherein multiple offshore structures are received on a transport apparatus;

The drawings are schematic. In the drawings, similar or corresponding elements have been provided with similar or corresponding reference signs.

In this disclosure a slip joint should be understood as at least meaning a joint between an offshore structure and a slip joint section of a transport apparatus or an offshore foundation which is formed and/or maintained under influence of the weight of the off shore structure.

In this disclosure a slip joint is preferably established between a lower end of an offshore element, especially forming a slip joint section of the offshore element, and a complementary slip joint section of the transport apparatus or a complementary slip joint section of the offshore foundation, especially a complementary slip joint section at an upper end of an offshore foundation.

In this disclosure a slip joint can comprise an upper end of a slip joint section of a transport apparatus or of an offshore foundation, having at least one inclining surface, and a lower end of an offshore structure having a complementary inclining surface, such that when the offshore structure is mounted onto the transport apparatus or onto the offshore foundation, the inclining surfaces mate. Inclining has to be understood as sloping relative to at least a vertical line or axis of the slip joint sections.

In embodiments the sloping surfaces can be formed by or as parts of a conical or frusto conical surface of the offshore structure and the slip joint sections of the transport apparatus and the offshore foundation. The sloping surfaces are preferably provided such that the weight of the offshore structure will push the offshore structure further onto the slip joint section of the transport apparatus or of the offshore foundation, providing for a fixing state.

A slip joint according to this disclosure can for example be, but is not limited to, a slip joint according to WO2018/070868.

Figure 1A:
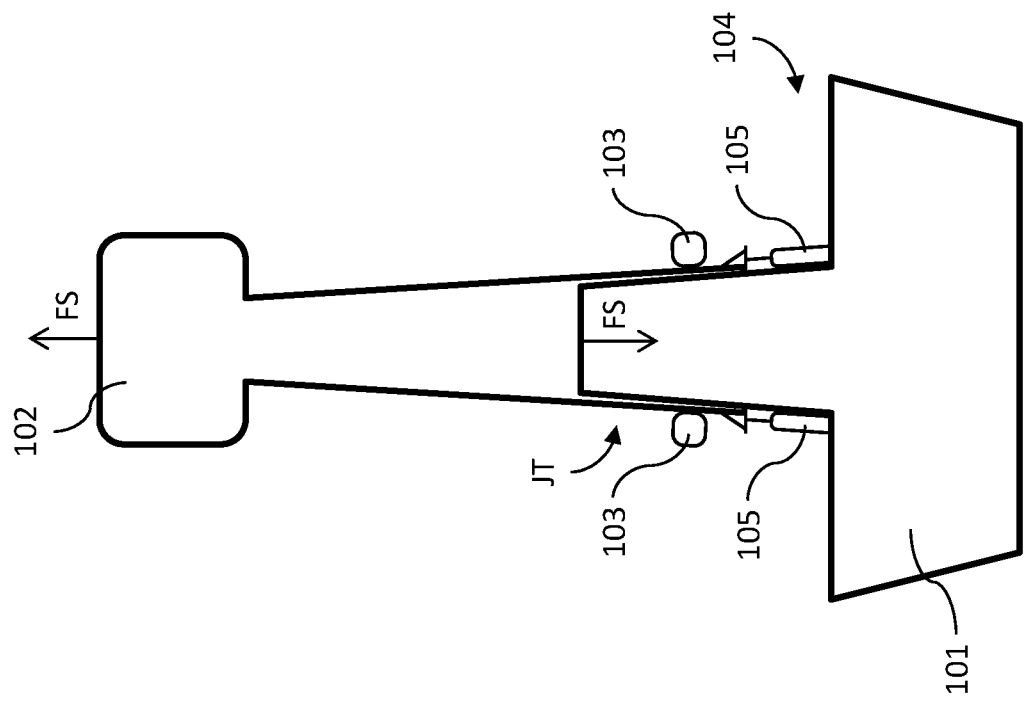
FIG. 1a shows a cross section view of a system according to an embodiment.

FIG. 1a shows a system according to an embodiment for transporting an offshore structure. The system comprises a transport apparatus 1, in particular a vessel or a vehicle, which is configured to receive an offshore structure 2 and to form a slip joint JT with a slip joint section 9 (see FIGS. 2c and 5) of a received offshore structure 2. In this example, a single slip joint JT is formed between the transport apparatus 1 and a slip joint section 8 of the offshore structure 2. Alternatively, the transport apparatus 1 and offshore structure 2 can be configured to form a plurality of slip joints JT there-between (in particular in case the offshore structure 2 is provided with a plurality of slip joint sections, wherein the transport apparatus 1 can have a plurality of slip joint sections 8 to receive the offshore structure 2 and to form a plurality of slip joints JT with the slip joint sections 9 of that structure 2). Providing a plurality of slip joints to transport a single structure can e.g. be implemented in case of transporting a multi-member offshore structure such as a jacket, tripod or topside, as will be appreciated by the skilled person.

Figure 5:
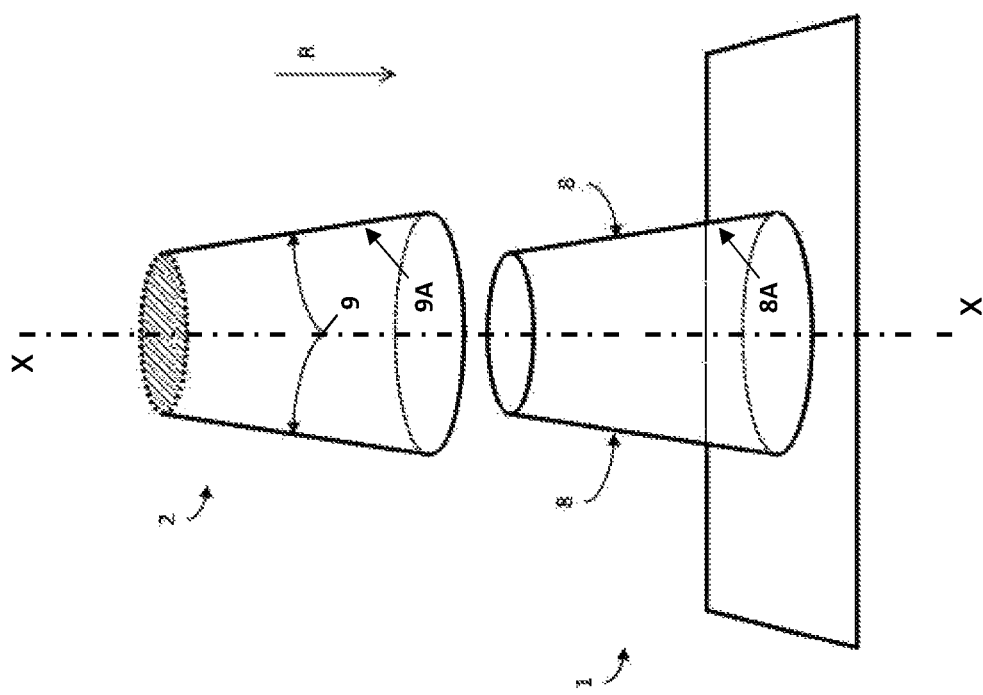
FIG. 5 shows a perspective exploded view of a slip joint section of an offshore structure and a respective slip joint section of a transport apparatus.

As can be seen in FIG. 5 the slip joint sections 8, 9 have parallel and preferably coinciding longitudinal axis X-X, which preferably extend substantially vertically, at least in a rest position of the offshore structure on a foundation or transport apparatus. The slip joint sections 8, 9 have sloping surfaces 8A, 9A, which are here shown as frusto-conical, by way of example only. The surfaces 8A, 9A slope relative to the line or axis X-X which here extends substantially vertical and/or substantially parallel to the forces FS and FL. The surfaces 8A, 9A are formed and slope such that the weight of the offshore structure will push the surfaces 8A, 9A further into contact with each other in a mating configuration.

The present system is configured to enter a releasable state, from a fixing state, wherein, in the releasable state, the slip joint force of the slip joint JT formed by the transport apparatus 1 and the offshore structure 2 is smaller than that force in the fixing state.

The slip joint JT can provide safe and efficient means for substantially quickly fastening the offshore structure 2 to the transport apparatus 1. For example, the slip joint JT can be formed and/or maintained under influence of the self weight of the offshore structure 2. Moreover, in this way, offshore structures of various dimensions can be interchangeably accommodated on the transport apparatus 1 substantially without requiring specific modification of the transport apparatus 1. See FIG. 3b for relevant examples of offshore structures 302, 302', 302" of various dimensions. By being configured to enter the releasable state, the system can provide safe and efficient means for substantially quickly releasing the offshore structure 2 from the transport apparatus 1.

Figure 2C:
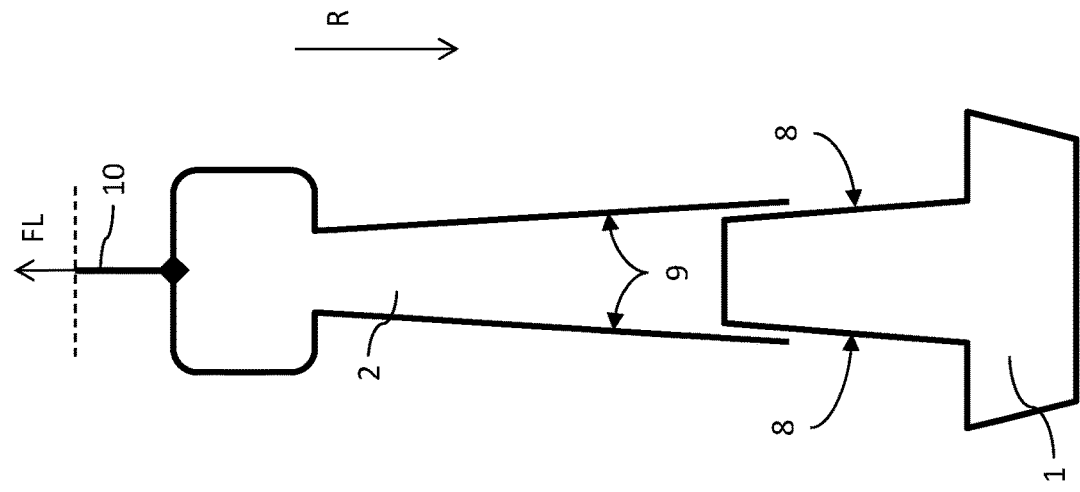
FIG. 2c shows a cross section view of the system of FIGS. 2a-2b, wherein an offshore structure is lifted by the lifting device.

In an embodiment, in the fixing state, the offshore structure 2 is fixed to the transport apparatus 1, wherein, in the releasable state, the offshore structure 2 is releasable from the transport apparatus 1, e.g. using a lifting means (e.g. as shown in FIG. 2c, lifting means 10).

Thus, by the system entering the releasable state, from the fixing state, the offshore structure 2 can be brought from a state wherein the structure is fixed to the transport apparatus 1 (e.g. for stable and secure transportation) to a state wherein the structure 2 can be released (e.g. for delivering the offshore structure 2 at a delivery location).

In an embodiment, with further reference to FIG. 1a, the system further comprises a vibration generator 3 for vibrating the transport apparatus 1 and the offshore structure 2 with respect to each other, in particular for reducing the slip joint force.

Figure 1B:
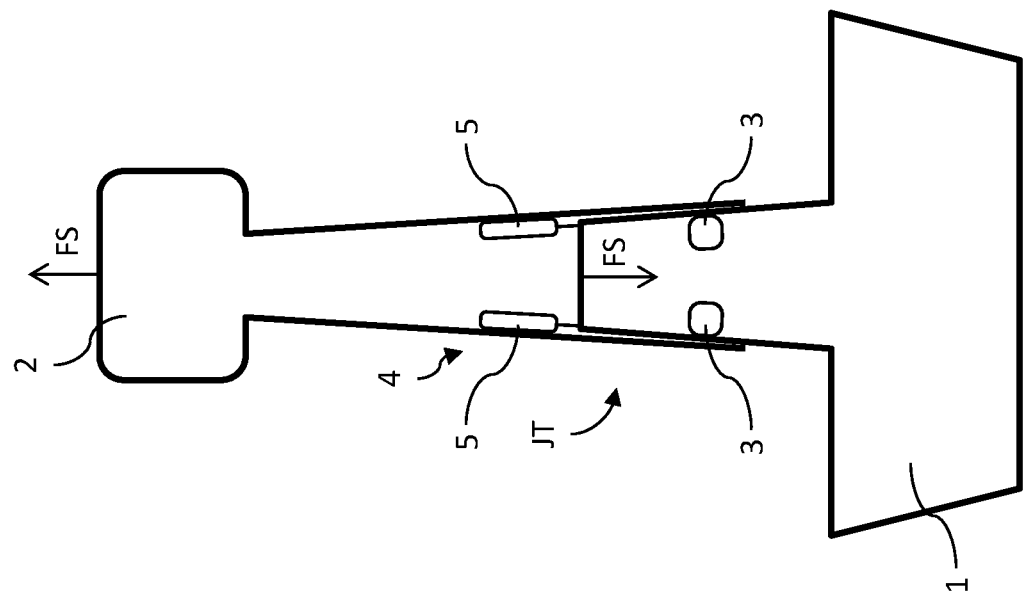
FIG. 1b shows a cross section view of a system according to a further embodiment.

It has been found that such a vibration generator 3 can provide effective means for reducing the slip joint force. In FIG. 1a the vibration generator, e.g. including one or more vibration motors, is attached to the transport apparatus 1. In other embodiments, e.g. as shown in FIG. 1b, the vibration generator 103 may be attached to the offshore structure 102. It will be appreciated that combinations and variations of these options are also possible.

The vibration is preferably generated substantially at one or more predetermined resonance frequencies.

It has been found that vibrations at such frequencies can be especially effective in reducing the slip joint force.

In an embodiment, the system further or alternatively comprises a separation system 4, for example including one or more mechanical force generators (e.g. one or more hydraulic jacks) 5, configured to exert a separating force FS between the offshore structure 2 and the transport apparatus 1. For example, such a mechanical force generator 5 can include mutually displaceable elements (e.g. being hydraulically and/or electrically powered), for generating said separation force between the structure 2 and transport apparatus 1. As follows from the drawing, the separation force FS preferably is directed in parallel with a gravity force direction (i.e. aimed at countering gravity). Said one or more mechanical force generators 5 can e.g. be configured to deliver a total maximum force that is significantly smaller (e.g. at least 10 times smaller) than the weight of the offshore structure 2 to be separated. Further, the separation system 4 is separate from an external lifting means 10 that can be used to lift the offshore structure 2 when the releasable state has been achieved (the lifting means 10 being capable of providing a lifting force that overcomes the weight of the offshore structure 2).

Such a separation system 4 can advantageously provide means to aid in the reduction of the slip joint force, for example complementary to the vibration generator 3, as well as to assist in separating the offshore structure 2 from the transport apparatus 1 while the slip joint force is reduced. Separating the offshore structure 2 from the transport apparatus 1 in this way can help to prevent that the slip joint force can increase again after having been reduced, for example under influence of the offshore structure's self weight and/or in response to handling of the offshore structure 2, e.g. by an external lifting means 10 (see FIG. 2c).

FIGS. 1a and 1b show different options of the separation system 4: FIG. 1a shows mechanical force generators 5 mounted to an internal surface of the offshore structure 2, configured to push substantially downwards against a top section of the transport apparatus 1; FIG. 1b shows mechanical force generators 5 mounted to the transport apparatus 1, configured to push substantially upwards against a bottom section of the offshore structure 2. It will be appreciated that combinations and variations of these options are also possible. While both the vibration generator 103 and the separating system 104 shown in FIG. 1b differ from those shown in FIG. 1a, it will also be appreciated that these variations are not necessarily interdependent.

With reference to FIG. 3a, in an embodiment the system, preferably the transport apparatus 201, comprises a clamping device 206 in addition to the slip joint JT, for clamping the offshore structure 202 and the transport apparatus 201 to each other, wherein, in the fixing state, compared to the releasable state, the offshore structure 202 and the transport apparatus 201 are substantially clamped to each other by the clamping device 206.

The clamping device 206 can provide complementary means for efficiently and quickly fastening and releasing the offshore structure 202.

The clamping device 206 is preferably configured to press, e.g. hydraulically, one or more, for example two, clamping elements 207, preferably in respective one or more clamping directions C which extend towards the transport apparatus 201 and/or the offshore structure 202.

As shown in FIGS. 2c and 5, in an embodiment, the transport apparatus 1 and the offshore structure 2 each include a respective slip joint section 8, 9, e.g. a sloping surface for example a conical surface or a frusto-conical surface, preferably mating surfaces, wherein the respective sections 8, 9 are configured to form the slip joint JT with each other, in particular when they are positioned onto each other, e.g. in a receiving direction R (see FIG. 5).

Figure 2B:
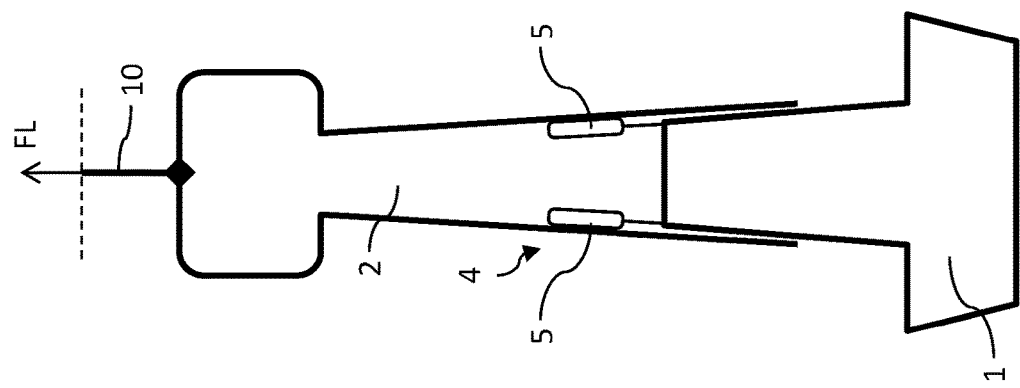
FIG. 2b shows a cross section view of the system of FIG. 2a, wherein the lifting device is in a substantially loaded state.

Such respective sections 8, 9 can provide effective means for forming the slip joint JT. Moreover, they can provide means for offshore structures of various dimensions to be interchangeably accommodated on the transport apparatus substantially without requiring specific modification of the transport apparatus. For example, as shown in FIG. 2b, sections having various sizes of frusto-conical surfaces of offshore structures 302, 302', 302" can be accommodated by lowering them down to respective sections of various levels of a frusto-conical surface of the transport apparatus.

It will be appreciated that the offshore structure 2 may be only partially shown in the schematic drawing of FIG. 5.

In an embodiment, as shown in FIGS. 2c and 5, the slip joint section 8 of the transport apparatus 1 is configured to receive the offshore structure 2 in a receiving direction R, in particular to form the slip joint JT (see e.g. FIG. 2a) with the slip joint section 9 of the offshore structure 2, wherein the receiving direction R substantially coincides with a direction of a force of gravity acting on the offshore structure 2, the receiving direction R being in particular a substantially downward direction.

Advantageously, the slip joint JT can thus be formed and/or maintained under influence of the self weight of the offshore structure 2.

Figure 2A:
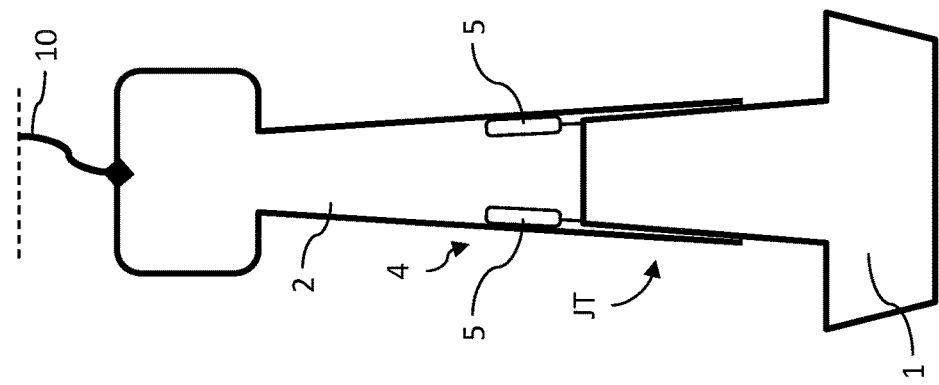
FIG. 2a shows a cross section view of a system according to an embodiment, wherein a lifting device is provided, wherein the lifting device is in a substantially unloaded state.
Figure 4B:
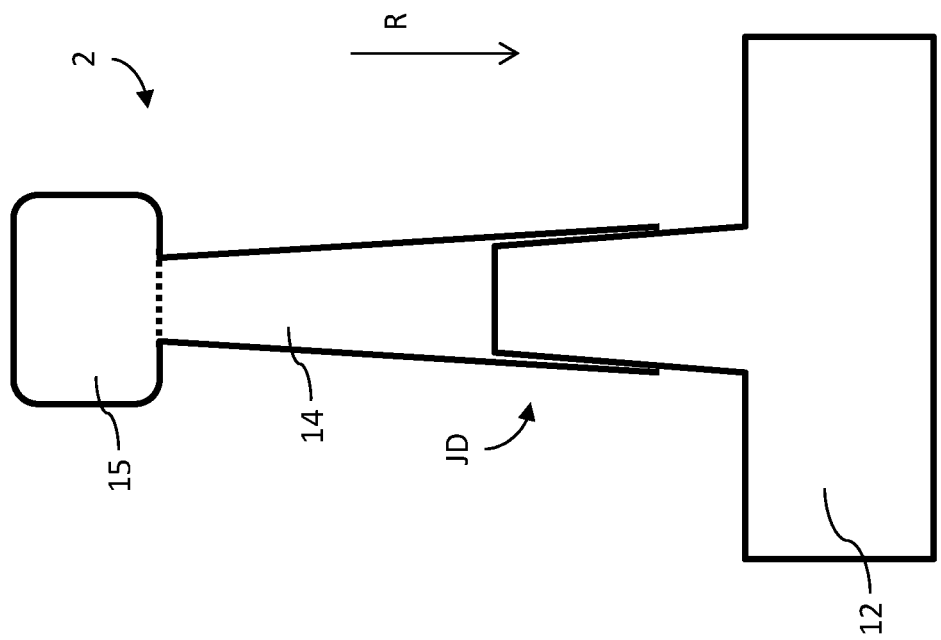
FIG. 4b shows a cross section view of a destination location base structure provided with an offshore structure according to an embodiment.

As shown in FIGS. 2a-2c, in an embodiment, the system further comprises a lifting device 10, e.g. a crane or the like, which is configured to lift the offshore structure 2 and preferably to position the offshore structure 2, in particular with respect to the transport apparatus 1 and/or with respect to another structure, e.g. a loading location base structure 11 (see FIG. 4a) and/or a delivery location base structure 12 (see FIG. 4b).

Such a lifting device 10 can provide means for releasing the offshore structure 2 from the transport apparatus 1, in particular when the system is in the releasable state. The same or similar lifting device 10 can be used for formation of the slip joint JT, e.g. by lowering the offshore structure 2 onto the transport apparatus 1 (e.g. in the receiving direction R, see FIG. 2c).

FIG. 2a shows the lifting device 10 in a substantially unloaded state, while the slip joint JT is formed. Upon the system entering the releasable state, the lifting device 10 may be brought to a loaded state, as shown in FIG. 2b, followed by a lifting of the offshore structure 2 by the lifting device 10, see FIG. 2c, wherein the offshore structure 2 is released from the transport apparatus 1. FIGS. 2b and 2c show a direction FL of the lifting device force of the lifting device 10.

In an embodiment, the system is configured for transporting the offshore structure 2 from a loading location, wherein the system further comprises a loading location base structure 11 (see FIG. 4a), for example a foundation, at the loading location, the loading location base structure 11 e.g. being configured to form a slip joint JL with the offshore structure 2, wherein the system is configured to enter a loading base releasable state, from a loading base fixing state, wherein, in the loading base releasable state, the slip joint force of a slip joint JL formed by the loading location base structure 11 and the offshore structure 2 is smaller than that force in the loading base fixing state.

In this way, the offshore structure 2 can be loaded safely, efficiently and quickly at the loading location. For example, the slip joint JL with the loading location base structure 11 can thus be formed and released similarly compared to the slip joint JT with the transport apparatus 1.

Figure 4A:
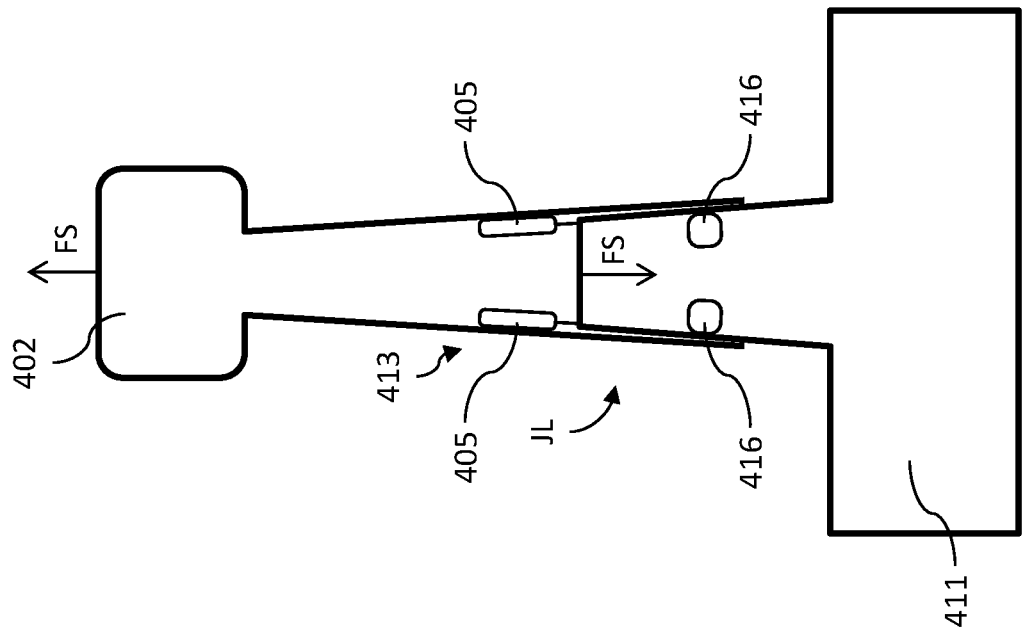
FIG. 4a shows a cross section view of a loading location base structure provided with an offshore structure according to an embodiment.

In an embodiment, with further reference to FIG. 4a, the system comprises a vibration generator 3 for vibrating the loading location base structure 11 and the offshore structure 2 with respect to each other, in particular for reducing the slip joint force of the slip joint JL formed by said structures, wherein the vibration is preferably generated substantially at one or more predetermined resonance frequencies.

Such a vibration generator can provide analogous advantages (mutatis mutandis) compared to the earlier described vibration generator for vibrating the transport apparatus and the offshore structure with respect to each other. In some embodiments, the vibration generator can be substantially the same as the earlier described vibration generator, for example when the vibration generator 3 is substantially included in the offshore structure 2. Alternatively, for example, as shown in FIG. 4a, the vibration generator may be a loading base vibration generator 410 which is attached to the loading location base structure 411.

In an embodiment, with further reference to FIG. 4a, the system comprises a loading base separation system 13, for example including one or more mechanical force generators 5, configured to exert a separating force FS between the offshore structure 2 and the loading location base structure 11.

Such a loading base separation system can provide analogous advantages (mutatis mutandis) compared to the earlier described separation system for exerting a separating force between the offshore structure and the transport apparatus. In some embodiments, the loading base separation system 13 can be substantially the same as or be included in the earlier described separation system 4, for example when the separation system 4 is substantially included in the offshore structure.

In an embodiment, with reference to FIG. 4b, the system is configured for transporting the offshore structure 2 to a delivery location, wherein the system further comprises a delivery location base structure 12, for example a foundation, at the delivery location, the delivery location base structure 12 being configured to receive the offshore structure 2 and to form a slip joint JD with the slip joint section 9 of the offshore structure 2.

In this way, the offshore structure 2 can be delivered safely, efficiently and quickly at the delivery location. For example, the slip joint JD with the delivery location base structure 12 can thus be formed similarly compared to the slip joint JT with the transport apparatus 1.

In an embodiment, as shown in FIG. 3b, the transport apparatus 1 is configured to receive a plurality of offshore structures 302, 302', 302" and to form a respective slip joint JT, JT', JT" with the slip joint section 9 of each received offshore structure 302, 302', 302", wherein the system is configured, for each received offshore structure 2, to enter a respective releasable state, from a respective fixing state, wherein, in the releasable state, the slip joint force of a slip joint JT formed by the transport apparatus 1 and the offshore structure 2 is smaller than that force in the fixing state.

Such a system can advantageously provide that multiple offshore structures can be transported simultaneously with benefit of the above mentioned advantages. It will be appreciated that the system may be configured to receive more or less than the number of offshore structures shown in FIG. 3b and that the relative positions of the received multiple offshore structures with respect to each other and with respect to the transport apparatus may be different from the configuration shown in FIG. 3b. For example, the offshore structures may be positioned according to a matrix structure. It will also be appreciated that the multiple offshore structures may or may not be each of the same type and/or dimensions.

In an embodiment, the offshore structure 2 includes one or more wind turbines 2 and/or one or more wind turbine components, for example a pile 14 and/or a nacelle 15 (see FIG. 4b). In other examples, the offshore structure 2 may include a jacket or a topside.

In an embodiment, the offshore structure 2 has a mass which is larger than fifty thousand kg or larger than 490.000 N.

Such a large mass can advantageously aid in forming a slip joint under influence of the self weight of the offshore structure.

A method for transporting an offshore structure comprises: receiving an offshore structure 2 on a transport apparatus 1 and forming a slip joint JT between the transport apparatus 1 and the received offshore structure 2; reducing a slip joint force of the slip joint JT; and releasing (see e.g. FIG. 2c) the offshore structure 2 from the transport apparatus 1 after reducing the slip joint force.

In an embodiment, the method further comprises generating a vibration of the offshore structure 2 and/or the transport apparatus 1, preferably substantially at one or more predetermined resonance frequencies, thereby reducing the slip joint force of the slip joint JT.

In an embodiment, the method further comprises exerting a separating force FS between the offshore structure 2 and the transport apparatus 1.

In an embodiment, the separating force FS is exerted before the vibration is generated.

It has been found that this can enhance the effectiveness of the vibrations in reducing the slip joint force.

In an embodiment, the separating force FS is exerted while the vibration is generated.

In this way the offshore structure 2 can be separated from the transport apparatus 1, in particular stably and in a well-controlled manner.

In an embodiment, the method further comprises: measuring a displacement of the offshore structure 2 with respect to the transport apparatus 1 and/or measuring a pressure between the offshore structure 2 and the transport apparatus 1; and releasing the offshore structure 2 from the transport apparatus 1 depending on the measured displacement and/or pressure.

In this way the offshore structure 2 can be released from the transport apparatus 1 is a smooth, safe and efficient manner. For example, the offshore structure 2 may be released after the displacement is measured to be larger than a predetermined threshold displacement and/or a pressure is measured to be smaller than a predetermined threshold pressure.

For measuring the displacement and/or pressure, the separating system 4 may include one or more measuring devices (not shown), e.g. a displacement measuring device (e.g. using a camera) and/or a pressure measuring device (e.g. for measuring a pressure of a hydraulic operating fluid, e.g. of a mechanical force generator or jack 5).

In an embodiment, the method further comprises using active heave compensation, in particular during the releasing.

It has been found that transporting, in particular releasing, the offshore structure can be more stable and/or well-controlled with the use of active heave compensation.

To this end, e.g. the lifting device 10 may include a system for active heave compensation. Relevant general systems and methods for active heave compensation will be known to the skilled person.

Above described embodiments may include a transport apparatus 1, in particular a vessel or a vehicle, wherein the transport apparatus 1 is configured to receive an offshore structure 2 and to form a slip joint JT with a slip joint section 9 of a received offshore structure 2.

In embodiments, the transport apparatus is provided with a vibration generator 3 for vibrating the transport apparatus 1 and an offshore structure 2 received on the transport apparatus 1 with respect to each other, in particular for reducing the slip joint force of the slip joint JT.

In embodiments, the transport apparatus is provided with a separation system 4, for example including one or more jacks and/or other force generators 5, configured to exert a separating force FS between the offshore structure 2 and the transport apparatus 1.

Above described embodiments may include an offshore structure 2, in particular including a wind turbine 2 and/or one or more wind turbine components 14, 15, wherein the offshore structure 2 has a slip joint section 9 configured to form a slip joint JT with a slip joint section 8 of a transport apparatus 1, e.g. an above described transport apparatus, in particular for fixing the offshore structure 2 to the transport apparatus 1.

In embodiments, the offshore structure is provided with a vibration generator 3 for vibrating a transport apparatus 1 on which the offshore structure 2 is received and the offshore structure 2 with respect to each other, in particular for reducing the slip joint force of the slip joint JT.

In embodiments, the offshore structure is provided with a separation system 4, for example including one or more mechanical force generators 5, configured to exert a separating force FS between a transport apparatus 1 and the offshore structure 2.

The embodiments as disclosed are shown by way of example only and should not be construed as limiting the scope of the disclosure. Many variations are possible within the scope of the invention as defined by the claims.

For example: the system may be configured to form more than one slip joint per offshore structure, e.g. two or three or four slip joints per offshore structure, wherein the multiple slip joints may be formed simultaneously, brought to a releasable state simultaneously, and/or released simultaneously. In this way, for example a jacket or a topside having for example three or four legs may be transported with the described advantages.

The vibration generator can be configured to generate vibrations of various durations and magnitudes for reducing the respective slip joint force, e.g. depending on the detailed configuration of the respective slip joint.

The vibration device can be configured for example to generate mutual acceleration, e.g. by providing at least one impulse to the slip joint, e.g. to the offshore structure, e.g. using an impact or hammer device, or the-like.

The transport device can be provided with a propulsion system, and/or it can be configured to be propelled by an external propulsion force.

The transport device can be a barge, for example. A received offshore structure may be additionally fastened to the transport apparatus using as such known fastening methods, e.g. using one or more nuts and bolts.

The offshore structure and/or the transport apparatus may include one or more, preferably respective, guiding means for guiding the offshore structure with respect to the transport apparatus during receiving and/or releasing of the offshore structure, for example to align the offshore structure with the transport apparatus.

A slip joint section 8 of a transport apparatus 1 can be configured in various ways. It may be an integral part of the transport apparatus 1, e.g. be made in one-piece with the transport apparatus 1, but that is not required.

A slip joint section 8 of a transport apparatus 1 may for example be a joint section that is welded and/or bolted to a support frame, deck and/or other section of the transport apparatus 1. The slip joint section 8 of the transport apparatus 1 may e.g. be made of steel, but that is not required. The slip joint section 8 of the transport apparatus 1 may also be a section that can be removed from the transport apparatus 1 after use (i.e. after us to provide a slip joint with an offshore structure 2 to be transported), e.g. for making the transport apparatus 1 available for another type of transport. These and other amendments, including but not limited to combinations of embodiments or parts thereof as disclosed are also considered to have been disclosed within the ambit of the claims.

LIST OF REFERENCE SIGNS

1. Transport apparatus
2. Offshore structure
3. Vibration generator
4. Separation system
5. Mechanical force generator
6. Clamping device
7. Clamping element
8. Slip joint section of transport apparatus
9. Slip joint section of offshore structure
10. Lifting device
11. Loading location base structure
12. Delivery location base structure
13. Loading base separation system
14. Pile
15. Nacelle
16. Loading base vibration generator
C. Clamping direction
FS. Separating force
FL. Lifting device force
JD. Slip joint formed by destination location base structure and offshore structure
JL. Slip joint formed by loading location base structure and offshore structure
JT. Slip joint formed by transport apparatus and offshore structure
R. Receiving direction

The invention claimed is:

1. A system for transporting an offshore structure, the system comprising:
a transport apparatus which is configured to receive an offshore structure and to form a slip joint with a slip joint section of the received offshore structure,
wherein the slip joint is established between a lower end of the received offshore element forming the slip joint section of the offshore element and a complementary slip joint section of the transport apparatus;
wherein the complementary slip joint section of the transport apparatus comprises a conical surface or a frusto-conical surface and the slip joint section of the off shore structure comprises a complementary conical surface or a frusto-conical surface,
wherein the slip joint is formed and/or maintained under influence of the self-weight of the offshore structure, wherein during use the conical surfaces or frusto-conical surfaces of the slip joint section and the complimentary slip joint section are configured to mate and are provided such that the self-weight of the off shore structure pushes the off shore structure further onto the slip joint section of the transport apparatus,
wherein the system is configured to enter a releasable state from a fixing state, wherein, in the releasable state, a slip joint force of the slip joint formed by the transport apparatus and the offshore structure is smaller than the slip joint force in the fixing state.

2. The system according to claim 1, wherein the system further comprises an off shore foundation comprising a foundation slip joint section having a conical surface or a frusto-conical surface complementary to the slip joint section of the off shore structure.

3. The system according to claim 1, wherein, in the fixing state, the offshore structure is fixed to the transport apparatus, and wherein, in the releasable state, the offshore structure is releasable from the transport apparatus using a lifting means.

4. The system according to claim 1, wherein the system further comprises:
a vibration generator for vibrating the transport apparatus and the offshore structure with respect to each other at one or more predetermined resonance frequencies for reducing the slip joint force.

5. The system according to claim 1, wherein the system further comprises:
a separation system including one or more mechanical force generators configured to exert a separating force between the offshore structure and the transport apparatus.

6. The system according to claim 1, wherein the transport apparatus comprises a clamping device, in addition to the slip joint, for clamping the offshore structure and the transport apparatus to each other,
wherein, in the fixing state, compared to the releasable state, the offshore structure and the transport apparatus are substantially clamped to each other by the clamping device.

7. The system according to claim 1, wherein the transport apparatus is configured to receive the offshore structure in a receiving direction to form the slip joint with the slip joint section of the offshore structure, wherein the receiving direction substantially coincides with a direction of a force of gravity acting on the offshore structure, the receiving direction being in a substantially downward direction.

8. The system according to claim 1, wherein the system further comprises:
a lifting device configured to lift the offshore structure.

9. The system according to claim 1, wherein the system is configured for transporting the offshore structure from a loading location, wherein the system further comprises:
a loading location base structure, at the loading location, the loading location base structure being configured to form a location slip joint with the offshore structure,
wherein the system is configured to enter a loading base releasable state, from a loading base fixing state, wherein, in the loading base releasable state, a slip joint force of the location slip joint formed by the loading location base structure and the offshore structure is smaller than the slip joint force in the loading base fixing state.

10. The system according to claim 9, wherein the system comprises:
a vibration generator for vibrating the loading location base structure and the offshore structure with respect to each other at one or more predetermined resonance frequencies for reducing the slip joint force of the location slip joint formed by said loading location base and offshore structure.

11. The system according to claim 9, wherein the system further comprises:
a loading base separation system including one or more mechanical force generators configured to exert a separating force between the offshore structure and the loading location base structure.

12. The system according to claim 1, wherein the system is configured for transporting the offshore structure to a delivery location, wherein the system further comprises:
a delivery location base structure at the delivery location, the delivery location base structure being configured to receive the offshore structure and to form a delivery slip joint with the slip joint section of the offshore structure.

13. The system according to claim 1, wherein the transport apparatus is configured to receive a plurality of offshore structures and to form a respective slip joint with the slip joint section of each received offshore structure,
wherein the system is configured, for each received offshore structure, to enter a respective releasable state, from a respective fixing state, wherein, in the releasable state, the slip joint force of each slip joint formed by the transport apparatus and the offshore structure is smaller than that force in the fixing state.

14. The system according to claim 1, wherein the offshore structure includes one or more wind turbines and/or one or more wind turbine components.

15. A method for transporting an offshore structure, the method comprising:
receiving an offshore structure on a transport apparatus and forming a slip joint between the transport apparatus and the received offshore structure, wherein the slip joint is formed and/or maintained under the influence of the self-weight of the offshore structure;
wherein the slip joint is formed by lowering a lower end of the off shore structure with a conical surface or a frusto conical surface onto a slip joint section of the transport apparatus having a complementary conical surface or a frusto conical surface;
reducing a slip joint force of the slip joint; and
releasing the offshore structure from the transport apparatus after reducing the slip joint force.

16. The method according to claim 15, the method further comprising:
generating a vibration of the offshore structure and/or the transport apparatus at one or more predetermined resonance frequencies, thereby reducing the slip joint force of the slip joint.

17. The method according to claim 15, the method further comprising:
exerting a separating force between the offshore structure and the transport apparatus.

18. The method according to claim 17, wherein the separating force is exerted before the vibration is generated and/or while the vibration is generated.

19. The method according to claim 15, the method further comprising:
measuring a displacement of the offshore structure with respect to the transport apparatus and/or measuring a pressure between the offshore structure and the transport apparatus; and
releasing the offshore structure from the transport apparatus depending on the measured displacement and/or the measured pressure.

20. The method according to claim 15, the method further comprising: using active heave compensation, in particular during the releasing.

21. The system according to claim 6, wherein the clamping device is configured to press one or more clamping elements in one or more clamping directions which extend towards the transport apparatus and/or the offshore structure.

22. The system according to claim 8, wherein the lifting device is configured to position the offshore structure with respect to the transport apparatus and/or with respect to another structure.

* * * * *